US006959177B1

(12) United States Patent
Oouchi

(10) Patent No.: US 6,959,177 B1
(45) Date of Patent: Oct. 25, 2005

(54) DSRC CAR-MOUNTED EQUIPMENT INCLUDING SENSITIVITY-INCREASING MEANS FOR COMMUNICATION IN AN ELECTRONIC TOLL COLLECTION SYSTEM

(75) Inventor: Jun Oouchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 675 days.

(21) Appl. No.: 09/635,636

(22) Filed: Aug. 10, 2000

(30) Foreign Application Priority Data

Mar. 28, 2000 (JP) ............................ 2000-089009

(51) Int. Cl.[7] ................................................ H04B 7/00

(52) U.S. Cl. ................ 455/254; 455/234.2; 455/245.1; 340/928

(58) Field of Search ............................ 455/254, 232.1, 455/233.1, 234.1, 234.2, 245.1, 426.1, 67.11, 455/126; 340/928, 901, 905, 539.1, 539.22, 340/539.23; 705/13

(56) References Cited

U.S. PATENT DOCUMENTS 5,933,097 A * 8/1999 Sakurai et al. .............. 340/928
6,175,791 B1 * 1/2001 Oouchi ........................ 340/438
6,300,882 B1 * 10/2001 Inoue .......................... 340/928
6,337,978 B1 * 1/2002 Inoue .......................... 455/421
6,339,381 B1 * 1/2002 Takikita ....................... 340/928
6,356,207 B1 * 3/2002 Oouchi ........................ 340/928
6,590,506 B1 * 7/2003 Oouchi ........................ 340/928

FOREIGN PATENT DOCUMENTS

JP 63-093241 4/1988 ............ H04B 1/40
JP 08-185548 7/1996 .......... G07B 15/00
JP 11-353586 12/1999 ............ H04B 7/26
JP 2000-089009 3/2000 ............ G02B 5/04

* cited by examiner

*Primary Examiner*—Rafael Perez-Gutierrez
(74) *Attorney, Agent, or Firm*—Sughrue Mion, PLLC

(57) ABSTRACT

A DSRC car-mounted equipment for transmitting and receiving data to and from an on-the-road equipment, preventing communication error after the start of communication. The equipment comprises reception sensitivity-increasing means 14, 15, 40 for increasing the reception sensitivity in a communication area with the on-the-road equipment in response to the entrance into a communication start area with the on-the-road equipment, wherein the reception sensitivity-increasing means returns the reception sensitivity back to the normal reception sensitivity of before entering into the communication start area in response to the end of communication with the on-the-road equipment.

3 Claims, 10 Drawing Sheets

DSRC CAR-MOUNTED EQUIPMENT INCLUDING SENSITIVITY-INCREASING MEANS FOR COMMUNICATION IN AN ELECTRONIC TOLL COLLECTION SYSTEM

BACKGROUND OF THE INVENTION

1. Field of the Invention

The present invention relates to a DSRC (dedicated short-range communication) car-mounted equipment such as the one for collecting the toll used for an ETC (electronic toll collection) system in an ITS (intelligent transport system). More particularly, the invention relates to a DSRC car-mounted equipment which prevents communication error after it has entered into the communication start area as a result of improving the reception sensitivity (and transmission output) during the communication with an on-the-road equipment.

2. Prior Art

There has heretofore been known a DSRC car-mounted equipment (hereinafter also referred to simply as "car-mounted equipment") for transmitting and receiving a variety of data through communication with an on-the-road equipment installed on a road on which a vehicle travels.

In the DSRC car-mounted equipment of this kind, in general, the reception sensitivity has been set constant irrespective of whether it is within the communication area or not. Therefore, the electric field intensity of the electromagnetic waves received from the on-the-road equipment varies depending upon the distance (position in a direction in which the vehicle is traveling) as shown in FIG. 9.

FIG. 9 is a diagram of characteristics illustrating intensities of the electric field received by the conventional DSRC car-mounted equipment, and shows a relationship between the electric field intensity for the distance from the antenna ANT of the on-the-road equipment and a predetermined level (threshold) TH corresponding to the reception sensitivity. Here, the antenna ANT of the on-the-road equipment is installed at a toll gate on a toll expressway.

In FIG. 9, the abscissa represents the position (distance in the direction in which the vehicle is traveling) of the car-mounted equipment with respect to the antenna ANT of the on-the-road equipment, and the ordinate represents the intensity of electric field received by the car-mounted equipment. The receiving area is set within about 4 meters from the antenna ANT of the on-the-road equipment.

Further, the communication start area set by the predetermined level TH (reception sensitivity) may include, depending on the environmental conditions, areas A, B where the electric field intensity so drops that the communication cannot be accomplished due to side lobes in the output from the antenna ANT of the on-the-road equipment.

As the vehicle approaches the on-the-road equipment, the communication is repeated a plural number of times between the on-the-road equipment and the car-mounted equipment as shown in FIG. 10.

FIG. 10 is a diagram illustrating the state of communication between the on-the-road equipment and the car-mounted equipment. In FIG. 10, the on-the-road equipment is repetitively transmitting the communication signal 1 to the car-mounted equipment at all times.

When the communication signal is received by the car-mounted equipment that has approached, the car-mounted equipment transmits a communication signal 2 to the on-the-road equipment.

Then, in response to the communication signal 2, the on-the-road equipment transmits a communication signal. When there is no response (communication signal 4) from the car-mounted equipment, however, the on-the-road equipment repetitively transmits the communication signal 3 (retrial transmission) until a response is received.

Here, the retrial communication operation by the on-the-road equipment is repeated about 100 to 200 times for every 2 milliseconds and, when there is quite no response from the car-mounted equipment, it is regarded that the communication is impossible (car-mounted equipment is not existing) and the communication ends.

However, due to traffic jam or some trouble, the vehicle mounting the equipment that has entered into the communication start area where the electric field intensity is not smaller than the predetermined level TH, may stay long (or may move at a very low speed) in the areas A, B where the electric field intensity drops during the plural times of retrial communication (which is a period lasting for about 0.5 seconds).

In this case, when the predetermined level TH of the car-mounted equipment remains constant as shown in FIG. 9, the communication signals 3 are not received from the on-the-road equipment, and the state where there is no response from the car-mounted equipment continues, spoiling the function of the car-mounted equipment.

According to the conventional DSRC car-mounted equipment as described above, the on-the-road equipment so judges that the communication is impossible when no communication signal 3 is received during the retrial transmission executed plural times by the on-the-road equipment while the vehicle is staying or is traveling at a low speed in the areas A, B where the electric field intensity drops, arousing such a problem that the function of the car-mounted equipment is not effectively utilized.

SUMMARY OF THE INVENTION

The present invention was accomplished in order to solve the above problem, and has an object of providing a DSRC car-mounted equipment capable of preventing a communication error after it has entered into the communication start area as a result of enhancing the reception sensitivity (and transmission output) during the communication with the on-the-road equipment.

The DSRC car-mounted equipment according to the present invention comprises:

a reception sensitivity-increasing means for increasing the reception sensitivity in a communication area relative to an on-the-road equipment in response to the entrance into a communication start area with the on-the-road equipment; wherein the reception sensitivity-increasing means returns the reception sensitivity back to the normal reception sensitivity of before entering into the communication start area in response to the end of communication with the on-the-road equipment.

In the DSRC car-mounted equipment according to the invention, the reception sensitivity-increasing means includes:

an electric field intensity detector for detecting the electric field intensity of a signal received from the on-the-road equipment;

a comparator circuit that compares the electric field intensity with a predetermined judging level and outputs an electric field intensity judgement signal when the electric field intensity is not smaller than the judging level; and a reception control unit for variably setting the judging level in response to the electric field intensity judgement signal; and wherein the reception control unit changes the judging level into a highly sensitive judging level lower than the normal judging level in response to a first electric field intensity judgement signal corresponding to the entrance into the communication start area, and fetches the reception data in the signals received in the communication area.

In the DSRC car-mounted equipment according to the invention, the reception sensitivity-increasing means includes:

a reception amplifier for amplifying a signal received from the on-the-road equipment;

an electric field intensity detector for producing an electric field intensity judgement signal upon detecting the electric field intensity of a signal through the reception amplifier; and a reception control unit for controlling the amplification factor of the reception amplifier in response to the electric field intensity judgement signal; wherein the reception control unit changes the amplification factor of the reception amplifier into an amplification factor larger than a normal amplification factor in response to a first electric field intensity judgement signal corresponding to the entrance into the communication start area, and fetches the reception data in the signals received in the communication area.

In the DSRC car-mounted equipment according to the invention, the reception sensitivity-increasing means changes the judging level into a highly sensitive judging level lower than a normal judging level in response to at least a first or a subsequent communication signal received from the on-the-road equipment after the entrance into the communication start area.

The DSRC car-mounted equipment according to the invention further comprises a vehicle speed control unit for producing a vehicle speed data of the vehicle, wherein the reception sensitivity-increasing means includes:

a predetermined value-setting means for setting a first predetermined value corresponding to a low-speed running state of the vehicle and a second predetermined value corresponding to a high-speed running state of the vehicle; and a vehicle speed-judging means for comparing the vehicle speed data with the first and second predetermined values; wherein when the vehicle speed data is smaller than the first predetermined value, the normal reception sensitivity is corrected toward the decreasing side; and when the vehicle speed data is larger than the second predetermined value, the normal reception sensitivity is corrected toward the increasing side.

The DSRC car-mounted equipment according to the invention further comprises transmission output-increasing means for increasing the transmission output to the on-the-road equipment in the communication area in response to the entrance into the communication start area, wherein the transmission output-increasing means returns the transmission output back to the normal transmission output of before entering into the communication start area in response to the end of communication with the on-the-road equipment.

In the DSRC car-mounted equipment according to the invention, the transmission output-increasing means includes:

a transmission amplifier for amplifying a signal transmitted to the on-the-road equipment; and a transmission control unit for controlling the amplification factor of the transmission amplifier in response to a signal received from the on-the-road equipment; wherein the transmission control unit changes the amplification factor of the transmission amplifier to an amplification factor larger than the normal amplification factor in response to at least a second or a subsequent communication signal received from the on-the-road equipment after the entrance into the communication start area.

The DSRC car-mounted equipment according to the invention further comprises:

a local oscillator related to a reception mixer and a transmission modulator for transmission and reception to and from the on-the-road equipment; and a transmission output-increasing means for increasing the transmission output to the on-the-road equipment in the communication area in response to the entrance into the communication start area; wherein the transmission output-increasing means returns the transmission output to the normal transmission output of before the entrance into the communication start area in response to the end of communication with the on-the-road equipment;

the reception sensitivity-increasing means and the transmission output-increasing means are constituted by an amplifier for amplifying a signal output from the local oscillator and a control unit for controlling the amplification factor of the amplifier in response to a signal received from the on-the-road equipment; and the control unit changes the amplification factor of the amplifier into an amplification factor larger than the normal amplification factor in response to at least a second or a subsequent communication signal received from the on-the-road equipment after the entrance into the communication start area.

The DSRC car-mounted equipment according to the present invention further comprises:

a car-mounted controller for processing data transmitted and received to and from the on-the-road equipment; and an external storage medium connected to the car-mounted controller for exchanging data related to the toll collection; wherein the car-mounted controller exchanges data related to the toll collection between the on-the-road equipment installed on a toll road and the external storage medium, and automatically executes the toll collection processing based on the data related to the toll collection.

DESCRIPTION OF THE PREFERRED EMBODIMENTS

Embodiment 1

An embodiment 1 of the invention will now be described with reference to the drawings.

Figure 1:
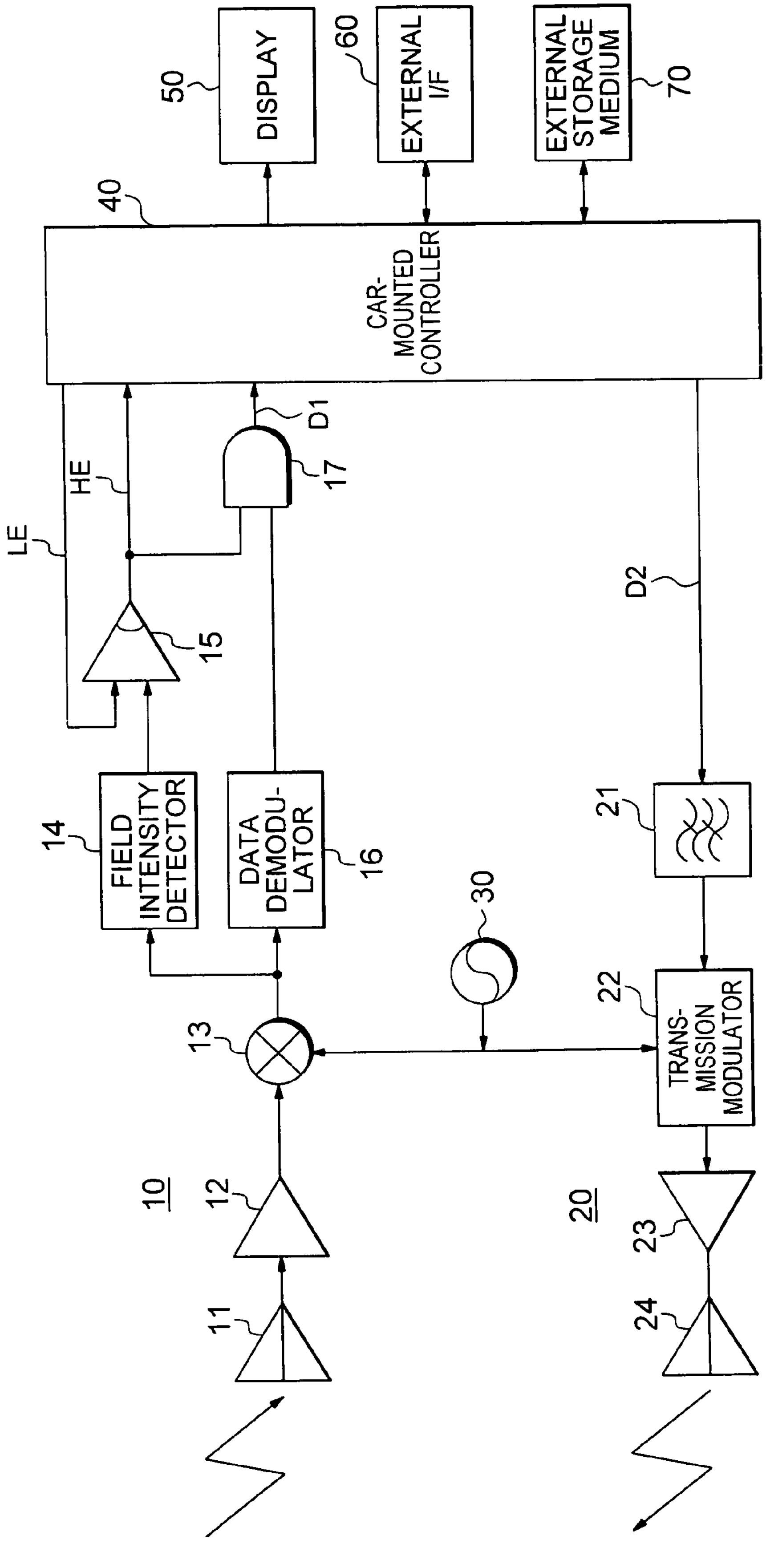
FIG. 1 is a block diagram schematically illustrating the constitution of an embodiment 1 of the present invention.
Figure 2:
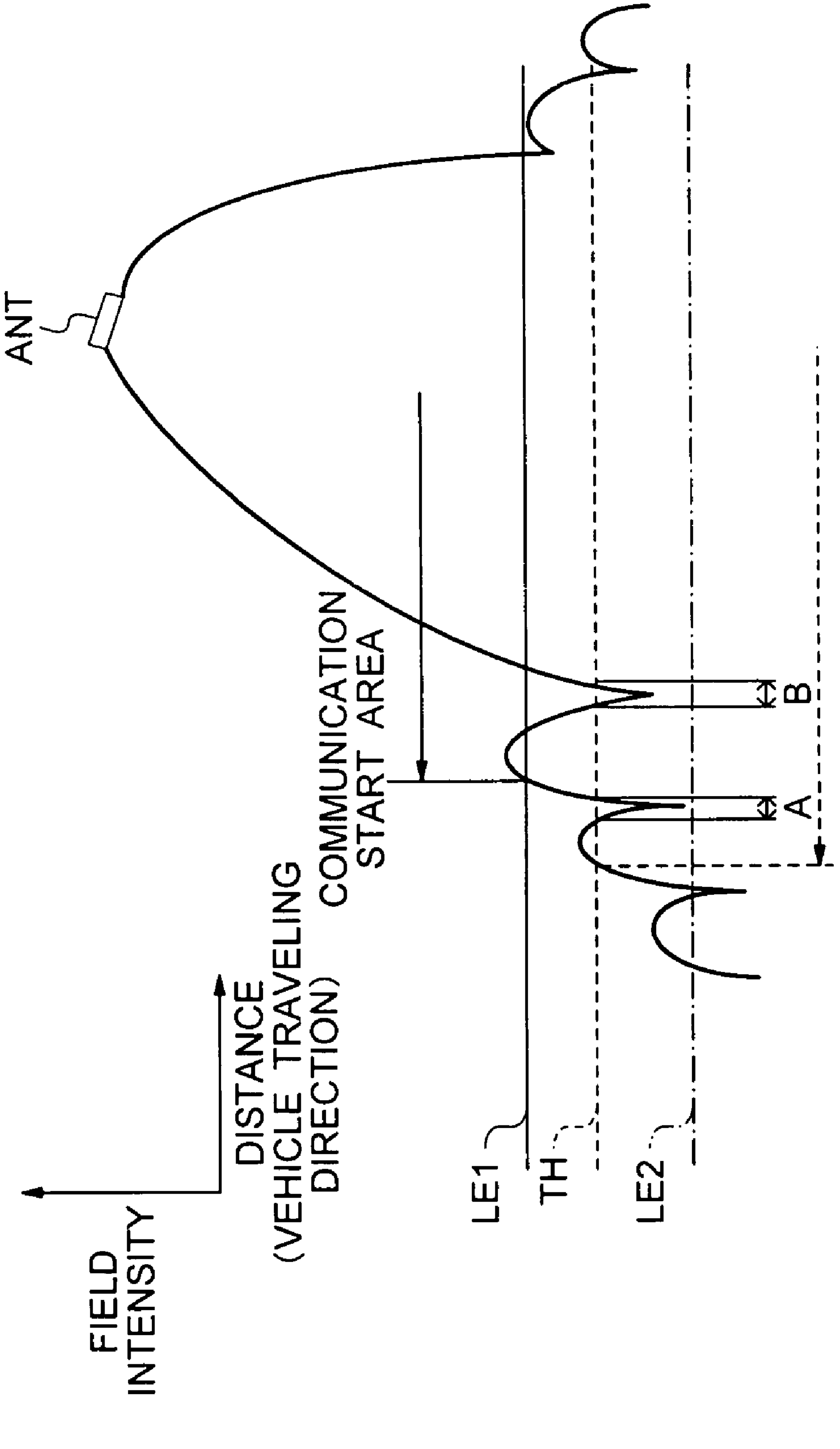
FIG. 2 is a diagram of characteristics showing the electric field intensity of the received signals according to the embodiment 1 of the invention.
Figure 3:
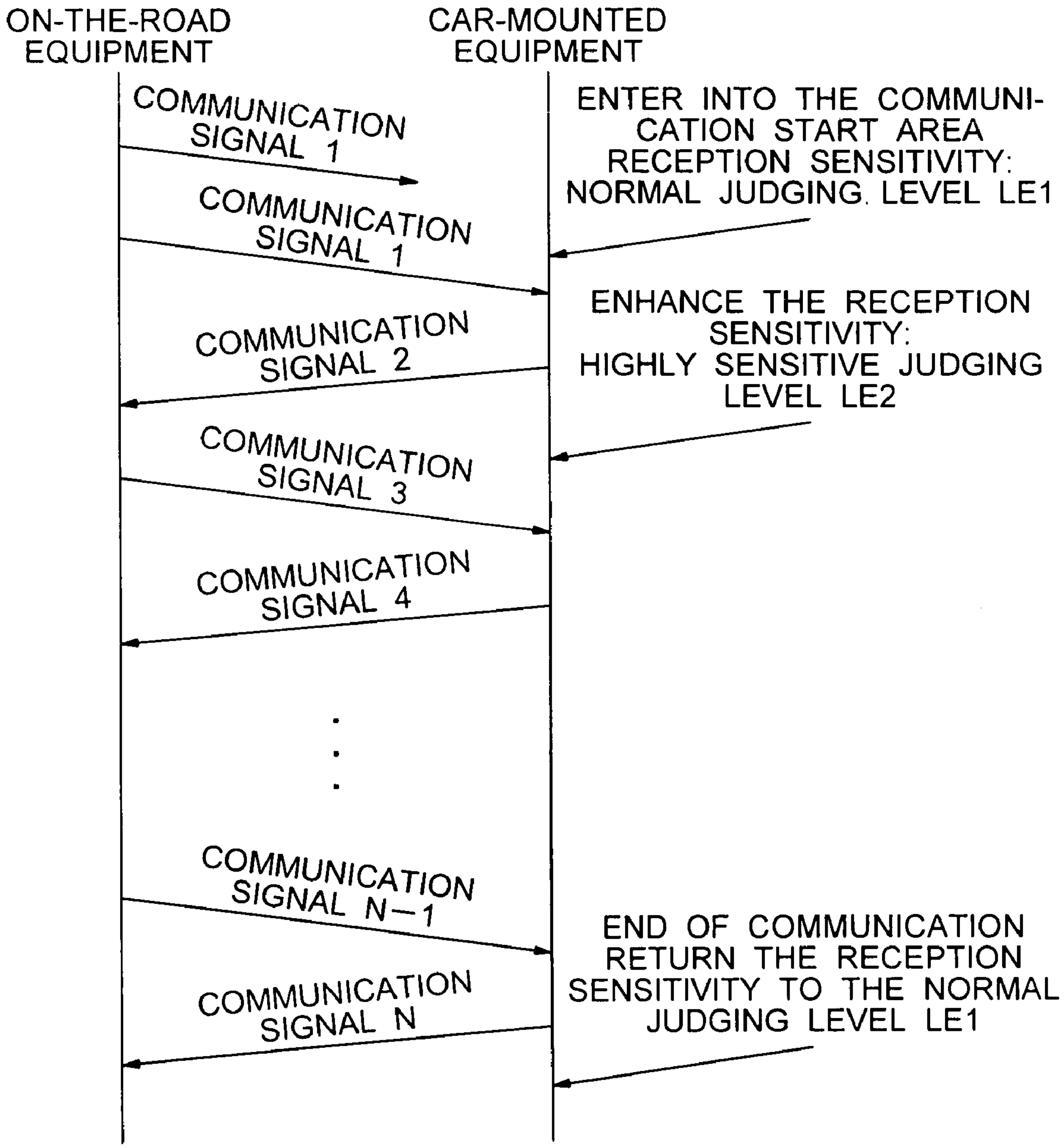
FIG. 3 is a diagram illustrating the state of communication with an on-the-road equipment according to the embodiment 1 of the invention.

FIGS. 1 to 3 are diagrams for illustrating the embodiment 1 of the invention, wherein FIG. 1 is a block diagram schematically illustrating the whole constitution, FIG. 2 is a diagram of characteristics showing the electric field intensity of the received signals, and FIG. 3 is a diagram illustrating the state of communication with an on-the-road equipment.

Figure 9:
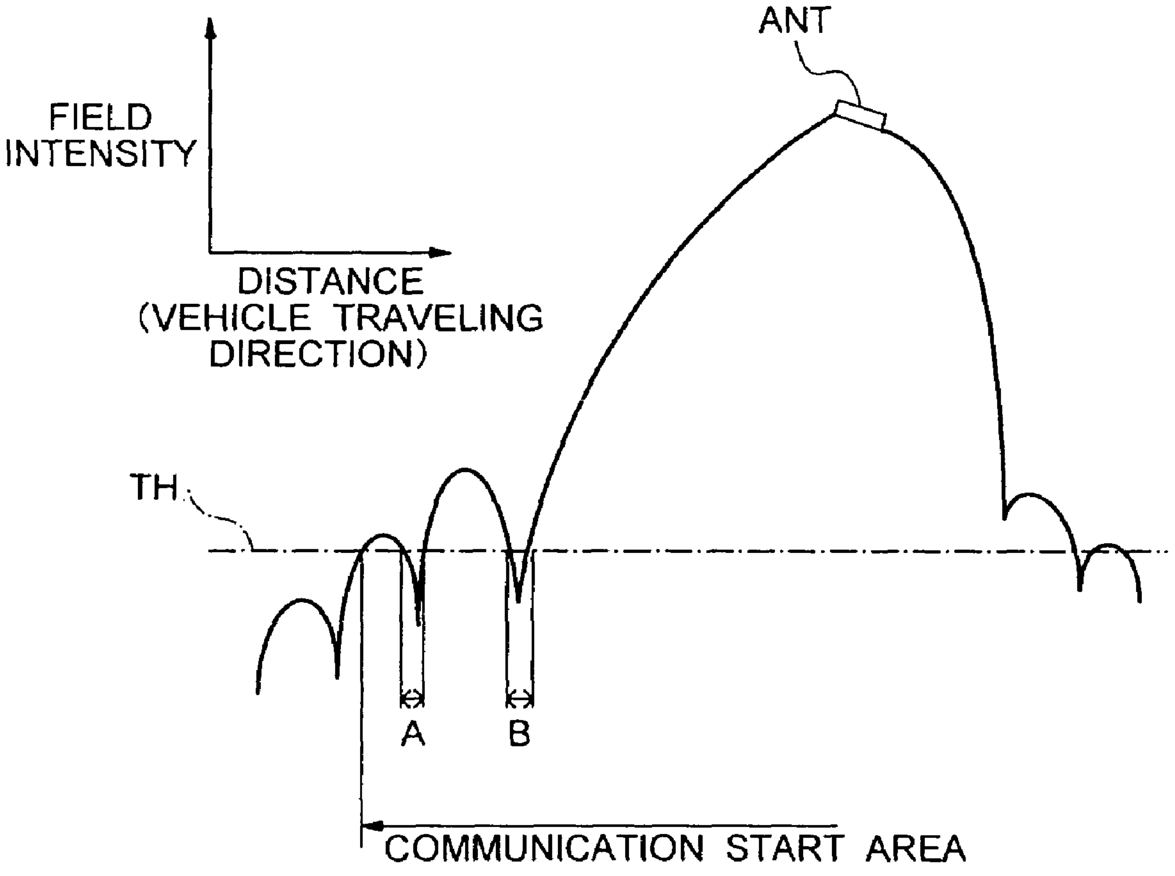
FIG. 9 PRIOR ART
FIG. 9 is a diagram of characteristics showing the intensity of an electric field received by a conventional DSRC car-mounted equipment.
Figure 10:
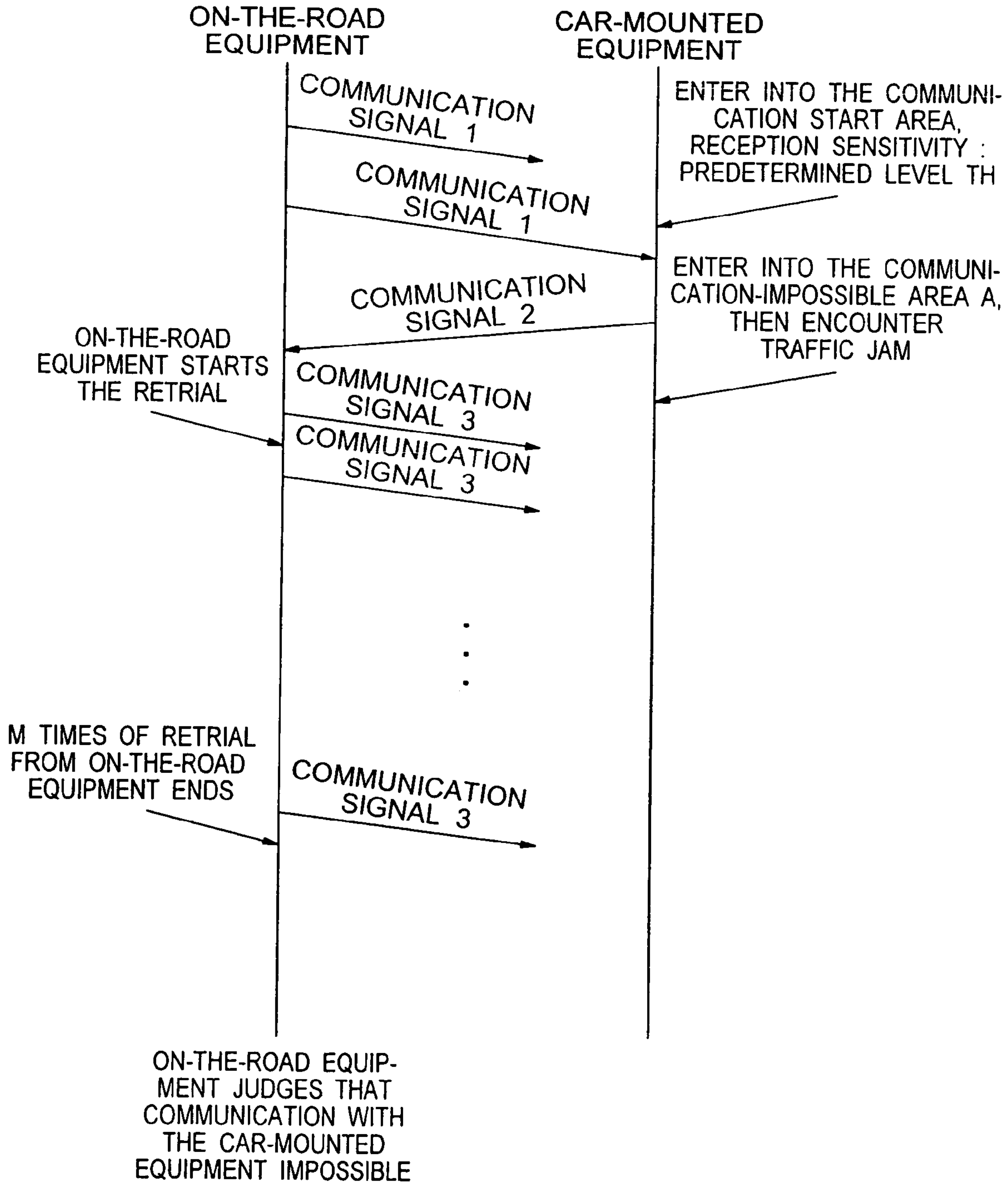
FIG. 10 PRIOR ART
FIG. 10 is a diagram illustrating the state of communication between the on-the-road equipment and the car-mounted equipment using the conventional DSRC car-mounted equipment.

FIGS. 2 and 3 are corresponding to FIGS. 9 and 10 described earlier.

In this case, too, the data communication for automatically collecting the toll is executed with respect to the on-the-road equipment installed on the toll road by using an ETC car-mounted equipment as the DSRC car-mounted equipment.

In FIG. 1, the DSRC car-mounted equipment is constituted by a reception/transmission unit, i.e., a reception unit 10 and a transmission unit 20, a local oscillator 30 related to the reception/transmission unit 10, 20, a car-mounted controller 40 for controlling the reception/transmission unit 10, 20, a display unit 50 connected to the car-mounted controller 40, an external interface 60 and an external storage medium 70.

The car-mounted controller 40 includes various arithmetic processing means, a reception control unit and a transmission control unit, fetches the data D1 received from an on-the-road equipment (not shown) via the reception unit 10, and transmits data D2 to the on-the-road equipment via the transmission unit 20.

The display unit 50 displays ETC data for collecting the toll in the case of the ETC car-mounted equipment, and the external interface 60 connects the car-mounted controller 40 to various external units. The external storage medium 70 may be an IC card, and exchanges data related to the toll collection through the car-mounted controller 40.

The reception unit 10 for sending the received data D1 to the car-mounted controller 40 is constituted by a reception antenna 11, a reception amplifier 12, a reception mixer 13, an electric field intensity detector 14, a comparator circuit 15, a data demodulator 16 and an AND circuit 17.

The transmission unit 20 for sending the transmission data D2 from the car-mounted controller 40 is constituted by a low-pass filter 21, a transmission modulator 22, a transmission amplifier 23 and a transmission antenna 24.

In the reception unit 10, the reception antenna 11 receives a signal transmitted from the antenna ANT of the on-the-road equipment, and the reception amplifier 12 amplifies a signal received from the on-the-road equipment via the reception antenna 11.

The reception mixer 13 mixes the signals received through the reception amplifier 12 with the frequency from the local oscillator 30.

The electric field intensity detector 14 detects the electric field intensity of the signal received through the reception mixer 13.

The comparator circuit 15 compares the electric field intensity detected by the electric field intensity detector 14 with a judging level LE, and outputs an electric field intensity judgement signal HE when the electric field intensity is larger than the judging level LE.

The data demodulator 16 demodulates the received data D1 from the signal received through the reception mixer 13.

The AND circuit 17 constitutes a gate circuit for the received data D1, and selectively permits the received data D1 to pass through in response to the electric field intensity judgement signal HE so as to be input to the car-mounted controller 40.

The electric field intensity detector 14, comparator circuit 15 and AND circuit 17 are constituting a reception sensitivity-increasing means together with the reception control unit in the car-mounted controller 40, and increases the reception sensitivity in the communication area with the on-the-road equipment as the DSRC car-mounted equipment enters into the communication start area with the on-the-road equipment.

That is, in response to a first electric field intensity judgement signal HE corresponding to the entrance into the communication start area, the reception control unit in the car-mounted controller 40 changes the judging level LE to a highly sensitive judging level LE2 lower than the normal judging level LE1, and fetches the reception data D1 in the signal received in the communication area.

Thus, the car-mounted controller 40 processes the data transmitted and received to and from the on-the-road equipment, exchanges the data related to the toll collection between the on-the-road equipment and the external storage medium 70, and automatically executes the toll collection processing based upon these data.

Further, in response to the end of communication with the on-the-road equipment, the reception control unit in the car-mounted controller 40 returns the reception sensitivity to the normal reception sensitivity of before the entrance to the communication start area.

In the transmission unit 20, the low-pass filter 21 permits the transmission data D2 from the transmission control unit in the car-mounted controller 40 to pass through and to be input to the transmission modulator 22.

The transmission modulator 22 effects the modulation by using the transmission data D2 and the output frequency of the local oscillator. The transmission amplifier 23 amplifies the modulated transmission data D2 to form a communication signal 2 for response (see FIG. 3), and the transmission antenna 24 transmits the transmission signal 2 toward the on-the-road equipment.

Next, the operation of the embodiment 1 of the invention shown in FIG. 1 will be concretely described with reference to FIG. 2 (diagram of characteristics showing changes in the electric field intensity) and FIG. 3 (diagram illustrating the communication operation).

In FIG. 2, the judging level LE for setting the reception sensitivity includes a normal judging level LE1 larger than the above-mentioned predetermined level TH (see FIG. 9) and a highly sensitive judging level LE2 smaller than the predetermined level TH.

First, when the communication signal 1 is received from the on-the-road equipment through the reception antenna 11, the received signal is amplified through the reception amplifier 12, is input to the reception mixer 13, and is down-converted by the output frequency of the local oscillator 30.

The received signal is then demodulated for data through the data demodulator 16, and is measured for its electric field intensity by the electric field intensity detector 14.

The electric field intensity of the received signal is compared by the comparator circuit 15 with the reception signal judging level LE output from the car-mounted controller 40.

The comparator circuit 15 judges whether the electric field intensity is larger than the judging level LE. When the electric field intensity is larger than the judging level LE, the electric field intensity judgment signal HE (on level) is input to the car-mounted controller 40 and to the AND circuit 17.

On the other hand, the data demodulated from the data demodulator 16 is input to the other input terminal of the AND circuit 17. Accordingly, the received data D1 is input to the car-mounted controller 40 only when the electric field intensity is greater than the predetermined reception sensitivity level determined by the judging level LE.

When the first electric field intensity judgement signal HE and the reception data D1 of the communication signal 1 are input, the car-mounted controller 40 recognizes that the car-mounted equipment has entered into the communication start area and processes the communication signal 1 (see FIG. 3).

Next, the car-mounted controller 40 outputs a transmission data D2 which is a communication signal 2.

The transmission data D2 is cut for its high-frequency components through the low-pass filter 21, modulated through the transmission modulator 22 by the electric power of a frequency of the local oscillator 30, and is transmitted as the communication signal 2 to the on-the-road equipment through the transmission amplifier 23 and the transmission antenna 24.

Thereafter, the communication signals 3 to N are transmitted plural times (N times) between the on-the-road equipment and the car-mounted equipment according to a communication protocol for toll reception, and the communication of toll collection is completed.

In this case, in order to enhance the reception sensitivity at least after the processing of the communication signal 1, the car-mounted controller 40 produces a highly sensitive judging level LE2 that is lower than the normal judging level LE1.

That is, prior to starting the communication with the on-the-road equipment as shown in FIG. 2, the judging level LE is set to the normal judging level LE1 in order to set a low reception sensitivity. After the reception of at least the communication signal 1, the judging level LE is changed to the highly sensitive judging level LE2 in order to set a high reception sensitivity.

At the start of the reception, therefore, the reception sensitivity is set with the relatively high normal judging level LE1, whereby the position of the vehicle that is judged to have entered into the communication start area is closer to the antenna ANT of the on-the-road equipment than the conventional vehicle position (see broken line). Therefore, a sufficiently high electric field intensity is obtained at a moment when it is judged that the vehicle has entered into the communication start area.

Thereafter, the reception sensitivity is enhanced being changed into the highly sensitive judging level LE2 which is lower than the normal judging level LE1. Therefore, the electric field intensity of not lower than the judging level LE is obtained even when the vehicle stops (or runs at a very low speed) in the communication-impossible area A or B.

Accordingly, the comparator circuit 15 produces the electric field intensity judgement signal HE enabling the received data D1 and the transmitted data D2 to be exchanged.

Thereafter, the judging level LE returns again back to the normal judging level LE1 at a moment when the communication of toll collection has completed, and becomes ready to cope with the next approach to the antenna ANT of the on-the-road equipment.

Thus, after the car-mounted equipment has entered the communication start area with the on-the-road equipment, the communication is executed at least one time. Thereafter, the reception sensitivity of the car-mounted equipment is enhanced in the communication area and after the end of the communication, the reception sensitivity is returned back to the reception sensitivity of before the entrance into the communication start area, suppressing the occurrence of reception-impossible state in the areas A, B where the electric field intensity drops being caused by side lobes of the on-the-road equipment.

Irrespective of whether the vehicle is halting or running, therefore, the data related to the toll collection can be reliably exchanged between the equipment mounted on the car traveling on a toll road and the on-the-road equipment at the toll gate, making it possible to collect the toll based on the communication data.

The embodiment 1 has dealt with the case where the DSRC car-mounted equipment was used as the ETC car-mounted equipment, the antenna unit and the equipment body were mounted on the vehicle traveling on a toll road, and the data related to the toll collection was exchanged relative to the on-the-road equipment to automatically collect the toll. However, the same actions and effects can be exhibited even when the invention is adapted to other DSRC car-mounted equipment.

In the above-mentioned embodiment 1, further, the reception sensitivity of the car-mounted equipment was enhanced immediately after the entrance into the communication start area (after the first reception of signal). However, the reception sensitivity may be enhanced by changing the judging level LE to the highly sensitive judging level LE2 after the reception of at least a first communication signal or a subsequent communication signal from the on-the-road equipment.

The received data D1 was sent to the car-mounted controller 40 through the AND circuit 17. However, the AND circuit 17 may be omitted when the car-mounted controller 40 is capable of judging the reception of the received data D1 in response to the electric field intensity judgement signal HE.

Embodiment 2

In the above-mentioned embodiment 1, the comparator circuit 15 was provided as the reception sensitivity-increasing means for determining the reception electric field intensity, and the judging level LE of the comparator circuit 15 was variably set. However, the amplification factor of the reception amplifier 12 may be variably set, instead.

Figure 4:
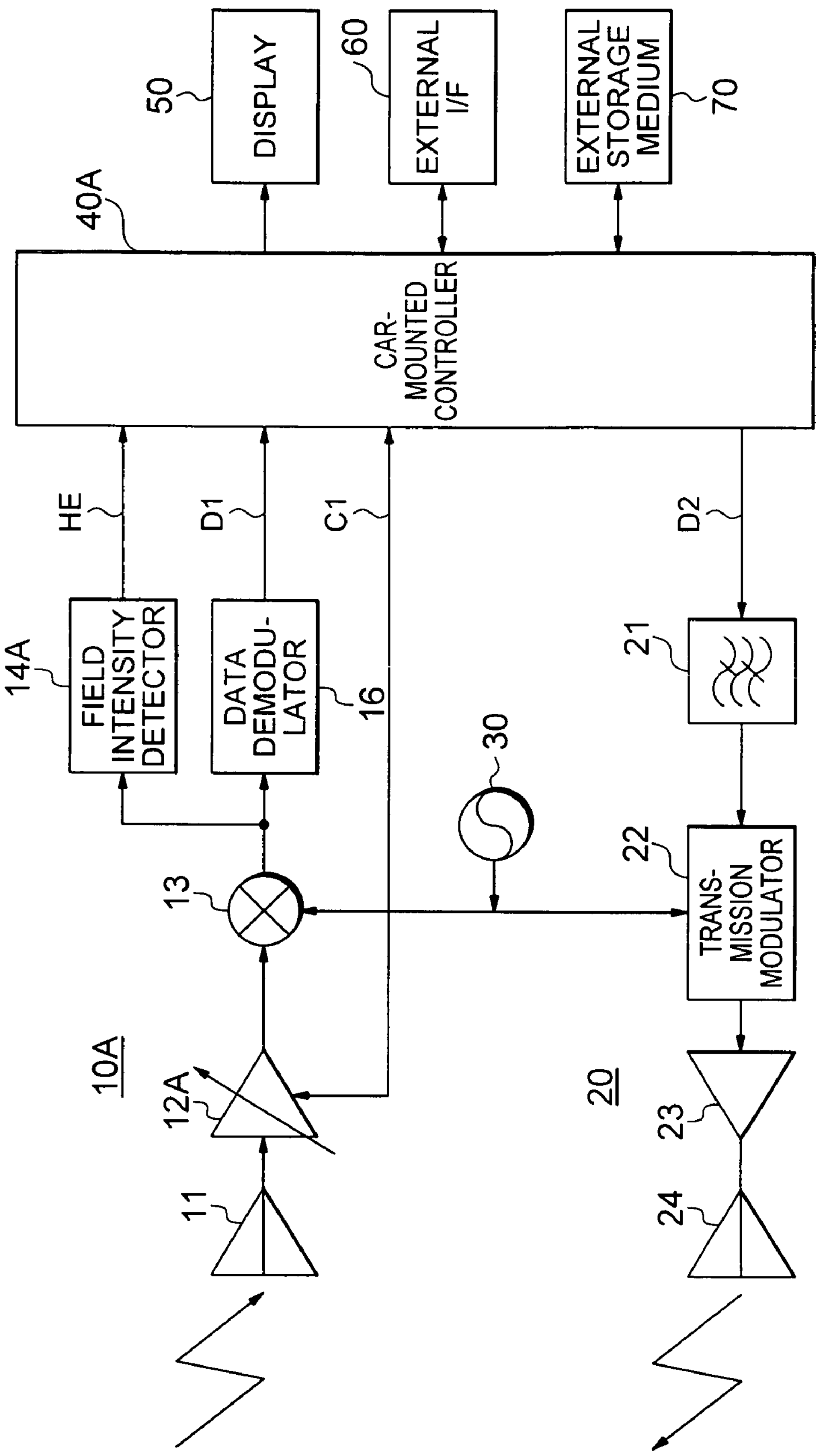
FIG. 4 is a block diagram schematically illustrating the constitution according to an embodiment 2 of the present invention.

FIG. 4 is a block diagram schematically illustrating the constitution of an embodiment 2 of the present invention in which the amplification factor of the reception amplifier 12A is variably set, and wherein the portions similar to those described above (see FIG. 1) are denoted by the same reference numerals, and the portions corresponding to those described above are denoted by the same reference numerals but to which are attached "A" but are not described again in detail.

In this case, the amplification factor (gain) of the reception amplifier 12A is variably set by a reception amplification factor-adjusting signal C1 from the car-mounted controller 40A.

The above-mentioned comparator circuit 15 and the AND circuit 17 are omitted, and the electric field intensity detector 14A directly inputs the electric field intensity judgement signal HE to the car-mounted controller 40A.

The car-mounted controller 40A directly fetches the electric field intensity judgement signal HE from the electric field intensity detector 14A and the data D1 received from the data demodulator 16.

In response to the electric field intensity judgement signal HE, the reception control unit in the car-mounted controller 40A forms the reception amplification factor-adjusting signal C1 to control the amplification factor of the reception amplifier 12A.

That is, the reception control unit in the car-mounted controller 40A constitutes the reception sensitivity-increasing means together with the reception amplifier 12A and the electric field intensity detector 14A, changes the amplification factor of the reception amplifier 12A to an amplification factor larger than the normal amplification factor in response to the first electric field intensity judgement signal HE corresponding to the entrance into the communication start area, and fetches the reception data D1 in the signal received in the communication area.

In FIG. 4, the reception control unit increases the amplification factor of the reception amplifier 12A by the reception amplification factor-adjusting signal C1 after the processing of at least the communication signal 1 (see FIG. 3).

Then, the reception sensitivity of the reception unit 10A is substantially shifted from the normal judging level LE1 (see FIG. 2) to the highly sensitive judging level LE2 to exhibit the actions and effects same as those described above.

Here, though the reception amplifier 12A was arranged in a stage preceding the reception mixer 13, the amplifier (not shown) may be varied when the amplifier is arranged in a stage (after the down-conversion) succeeding the reception mixer 13.

Further, though the amplification of the reception amplifier 12A was variably set in two steps, it is allowable to variably set the amplification factor in plural steps.

When an attenuator (not shown) exists in the reception unit 10A, the attenuation factor of the attenuator may be variably set to variably set the level of reception sensitivity as described above.

Embodiment 3

Though the above-mentioned embodiments 1 and 2 were provided with the reception sensitivity-increasing means only, it is further allowable to provide a transmission output-increasing means to variably set the amplification factor of the transmission amplifier 23.

Figure 5:
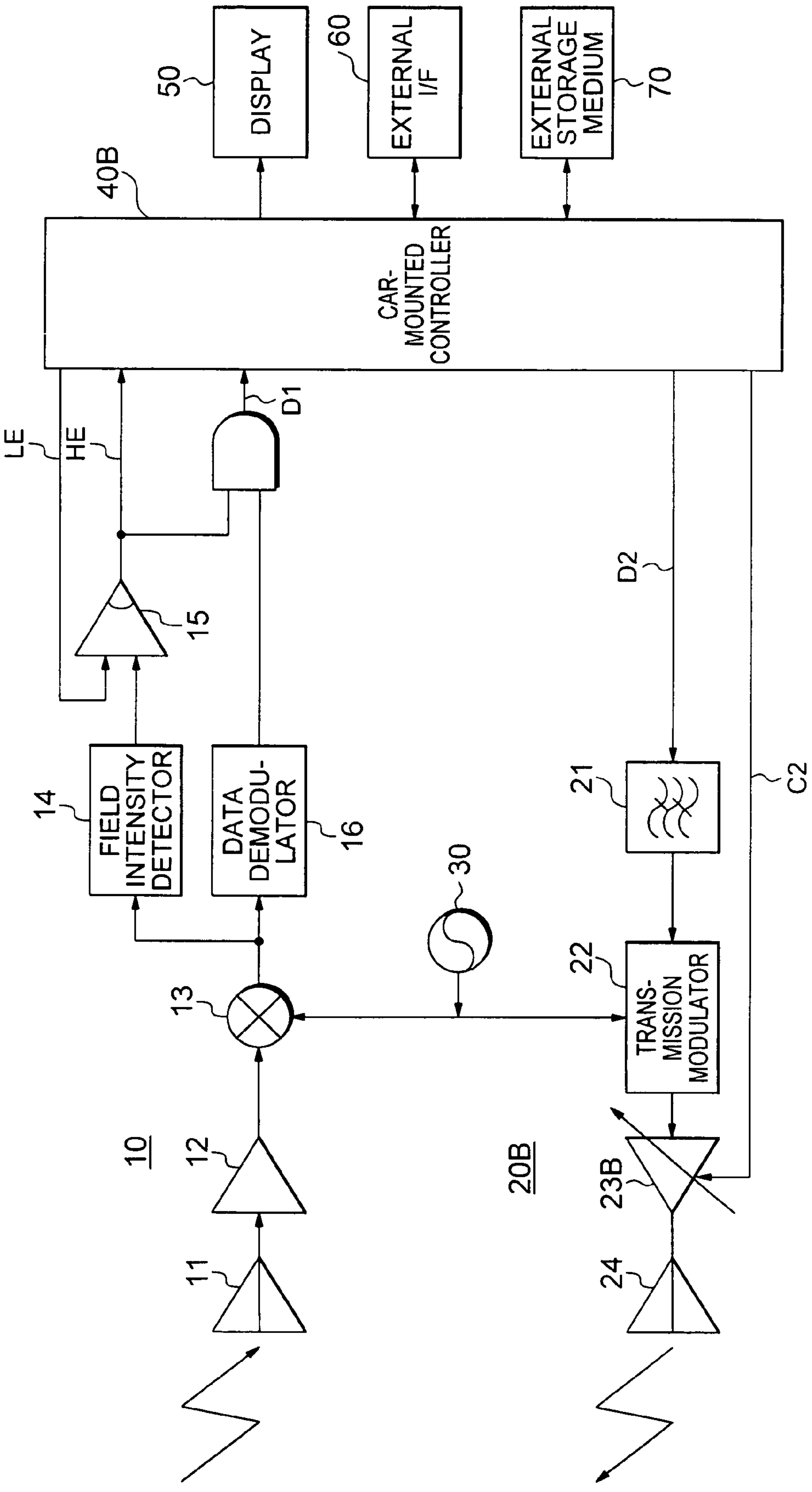
FIG. 5 is a block diagram schematically illustrating the constitution according to an embodiment 3 of the present invention.

FIG. 5 is a block diagram illustrating an embodiment 3 of the invention to which the transmission output-increasing means is added, and wherein the portions similar to those described above (see FIG. 1) are denoted by the same reference numerals, and the portions corresponding to those described above are denoted by the same reference numerals but to which are attached "B" but are not described again in detail.

In this case, the amplification factor (gain) of the transmission amplifier 12B is variably set by a transmission amplification factor-adjusting signal C2 from the car-mounted controller 40B.

The transmission control unit in the car-mounted controller 40B forms a transmission amplification-adjusting signal C2 in response to at least the second or subsequent communication signal and the electric field intensity-judgement signal HE received from the on-the-road equipment to control the amplification factor of the transmission amplifier 23B.

That is, the transmission control unit in the car-mounted controller 40B constitutes the transmission output-increasing means together with the transmission amplifier 23B, and increases the transmission output to the on-the-road equipment in the communication area in response to the entrance into the communication start area.

In FIG. 5, the transmission control unit in the car-mounted controller 40B outputs the transmission amplification factor-adjusting signal C2 in response to at least the second or subsequent communication signal received after having entered into the communication start area, and changes the amplification factor of the transmission amplifier 23B to an amplification factor larger than the normal amplification factor after the transmission of at least the communication signal 2 (see FIG. 3).

In the areas A, B (see FIG. 2) where the electric field intensity of the electromagnetic waves output from the antenna ANT of the on-the-road equipment drops, in general, it becomes difficult to receive the communication signal 4 from the car-mounted equipment even on the side of the on-the-road equipment. To prevent this, therefore, it is desired to enhance the transmission output of the car-mounted equipment after the communication signal 3 (or a subsequent communication signal) is received.

Referring to FIG. 5, therefore, an electric field is maintained that is necessary for the communication between the on-the-road equipment and the car-mounted equipment in the communication area, the reception sensitivity is enhanced in the communication area, and the transmission output is increased by increasing the amplification factor of the transmission amplifier 23B thereby to reliably prevent communication error.

After the end of communication, further, they are returned back to the normal reception sensitivity and the normal transmission output of before entering into the communication area in response to an end of communication with the on-the-road equipment.

When an attenuator (not shown) exists in the transmission unit 20B, the attenuation factor of the attenuator may be variably set to variably set the transmission output.

Embodiment 4

Figure 6:
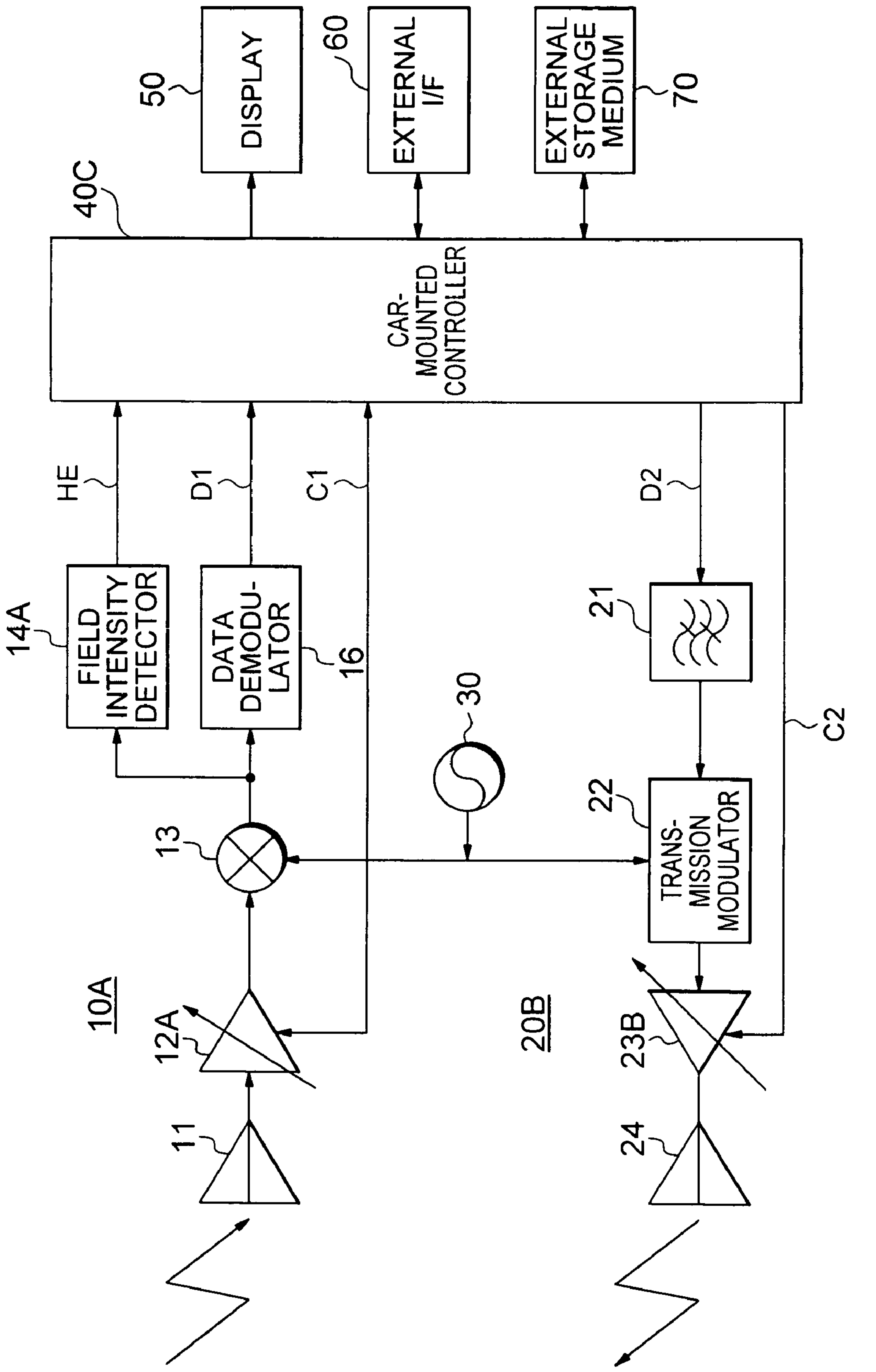
FIG. 6 is a block diagram schematically illustrating the constitution according to an embodiment 4 of the present invention.

The above embodiment 3 has employed the reception unit having the comparator circuit 15. As shown in FIG. 6, however, there may be employed the reception unit 10A having a reception amplifier 12A.

In this case, the circuit operations of the reception unit 10A and of the transmission unit 20B are as described above in the embodiment 2, exhibiting the same actions and effects.

Embodiment 5

In the above embodiment 3 (see FIG. 5), the reception unit 10 and the transmission unit 20B were provided with the reception sensitivity-increasing means and the transmission output-increasing means in order to increase the reception sensitivity and the transmission output. It is, however, also allowable to simultaneously increase the reception sensitivity and the transmission output by variably setting the amplification factor for the output signals of the local oscillator 30.

Figure 7:
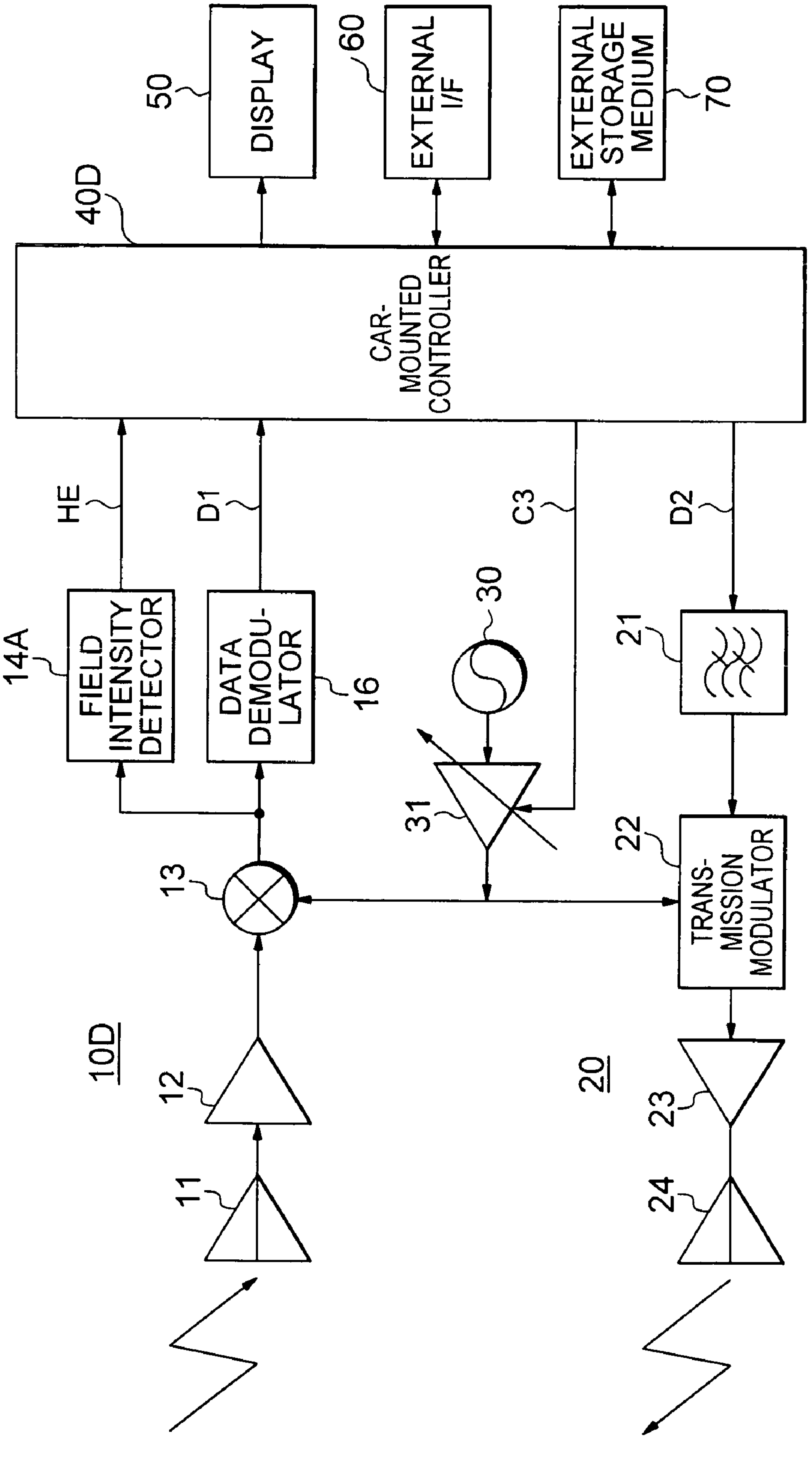
FIG. 7 is a block diagram schematically illustrating the constitution according to an embodiment 5 of the present invention.

FIG. 7 is a block diagram illustrating an embodiment 5 of the invention in which the amplification factor is variably set for the output signals of the local oscillator 30, and wherein the portions similar to those described above (see FIGS. 1 to 4) are denoted by the same reference numerals, and the portions corresponding to those described above are denoted by the same reference numerals but to which are attached "D" but are not described again in detail.

In FIG. 7, an amplifier 31 is inserted on the output side of the local oscillator 30, and its amplification factor (gain) is variably set by an amplification factor-adjusting signal C3 from the car-mounted controller 40D.

In this case, the separate reception sensitivity-increasing means and the transmission output-increasing means are provided for neither the reception unit 10D nor the transmission unit 20.

The car-mounted controller 40D includes a control unit that controls the amplification factor of the amplifier 31 in response to the electric field intensity-judgement signal HE.

That is, the control unit changes the amplification factor (gain) of the amplifier 31 to an amplification factor higher than the normal amplification factor in response to at least the second or a subsequent communication signal received from the on-the-road equipment after the entrance into the communication start area.

The amplifier 31 for amplifying the output signal of the local oscillator 30, the electric field intensity detector 14A and the control unit in the car-mounted controller 40D are constituting the reception sensitivity-increasing means and the transmission output-increasing means.

In response to the end of communication with the on-the-road equipment, the control unit in the car-mounted controller 40D returns the reception sensitivity and the transmission output back to the normal reception sensitivity and the normal transmission output of before the entrance into the communication start area.

This makes it possible to enhance the reception sensitivity level and the transmission output at the time of entrance into the communication start area to obtain the same actions and effects as those described above.

When there is an attenuator (not shown) in a stage succeeding the local oscillator 30, the attenuation factor of the attenuator may be variably set.

Embodiment 6

In the above-mentioned embodiments 1 to 5, consideration was given to the vehicle speed data only. In fact, however, the communication-impossible regions due to the areas A, B where the electric field intensity drops are closely related to the vehicle speed. Therefore, the normal judging level LE1 (normal reception sensitivity) may be variably set depending upon the vehicle speed data.

Figure 8:
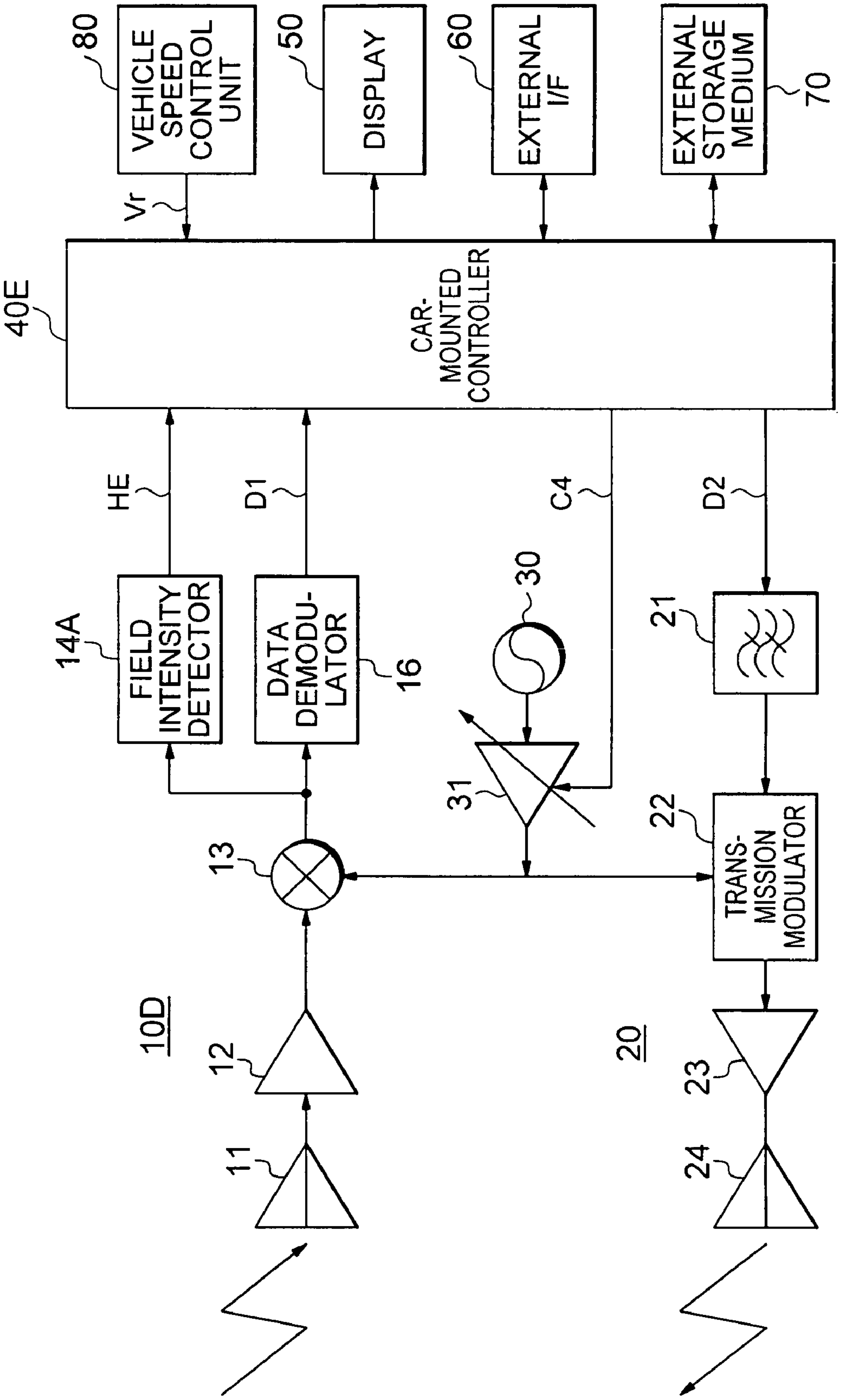
FIG. 8 is a block diagram schematically illustrating the constitution according to an embodiment 6 of the present invention.

FIG. 8 is a block diagram illustrating an embodiment 6 of the invention in which the amplification factor of the amplifier 31 is variably set depending upon the vehicle speed data Vr, and wherein the same portions as those described above (see FIG. 7) are denoted by the same reference numerals but are not described again in detail.

In FIG. 8, a vehicle speed control unit 80 that produces data Vr related to the speed of the vehicle is connected to the car-mounted controller 40E. Further, an amplification factor-adjusting signal C4 that differs depending upon the vehicle speed data Vr is output to the car-mounted controller 40E.

The car-mounted controller 40E that constitutes the reception sensitivity-increasing means in relation to the amplifier 31, includes a predetermined value-setting means for setting a first predetermined value corresponding to a low-speed running stage of the vehicle and a second predetermined value corresponding to a high-speed running state of the vehicle, and a vehicle speed-judging means for comparing the vehicle speed data with the first and second predetermined values.

That is, the vehicle speed-judging means in the car-mounted controller 40E compares the vehicle speed data Vr with the first predetermined value and with the second predetermined value (larger than the first predetermined value), corrects the normal reception sensitivity and the normal transmission output of when entering into the communication start area toward the decreasing side when the vehicle speed data Vr is smaller (low speed) than the first predetermined value, and corrects the normal reception sensitivity and the normal transmission output toward the increasing side when the vehicle speed data is larger (high speed) than the second predetermined value.

During the low-speed operation of from about 5 km to about 15 km an hour, in general, the vehicle may stay long (0.5 seconds or longer) in the areas A, B where the electric field intensity drops and may results in a communication-impossible state. It is therefore desired to set the initial normal reception sensitivity to be as low as possible and to greatly increase the reception sensitivity after the entrance into the communication start area.

When running at a high speed which is not lower than 15 km an hour, on the other hand, the vehicle does not stay long in the areas A, B where the electric field intensity drops, and the communication-impossible state may rarely result. In this case, therefore, the initial normal reception sensitivity may be set to be relatively high and may be slightly increased after the entrance into the communication start area.

As shown in FIG. 8, therefore, increments in the reception sensitivity and in the transmission output are variably set depending upon the vehicle speed data Vr, thereby to set an optimum reception sensitivity and transmission sensitivity depending upon the vehicle speed.

Here, the amplification factor of the amplifier 31 on the output side of the local oscillator 30 was variably set by the amplification factor-adjusting signal C4. It is, however, also allowable to variably set the amplification factors of the amplifiers in the reception unit and in the transmission unit.

As shown in FIG. 1, further, the judging level LE of the comparator circuit 15 may be variably set, or the reception sensitivity only may be increased.

In the above-mentioned embodiments 1 to 6, it needs not be pointed out that the reception sensitivity and the transmission output are varied within ranges specified under the Wireless Telegraphy Act.

What is claimed is:

1. A DSRC car-mounted equipment for transmitting and receiving data with an on-the-road equipment comprising:

a reception sensitivity-increasing means for increasing the reception sensitivity in a communication area with an on-the-road equipment in response to the entrance into a communication start area with the on-the-road equipment; wherein the reception sensitivity-increasing means returns the reception sensitivity back to a normal reception sensitivity of before entering into the communication start area in response to the end of communication with the on-the-road equipment, said DSRC car-mounted equipment further comprising:

a local oscillator related to a reception mixer and a transmission modulator for transmission and reception to and from the on-the-road equipment; and a transmission output-increasing means for increasing the transmission output to the on-the-road equipment in the communication area in response to the entrance into the communication start area; wherein the transmission output-increasing means returns the transmission output to the normal transmission output of before the entrance into the communication start area in response to a end of communication with the on-the-road equipment;

the reception sensitivity-increasing means and the transmission output-increasing means are constituted by an amplifier for amplifying a signal output from the local oscillator and a control unit for controlling the amplification factor of the amplifier in response to a signal received from the on-the-road equipment; and the control unit changes the amplification factor of the amplifier into an amplification factor larger than a normal amplification factor in response to at least a second or a subsequent communication signal received from the on-the-road equipment after the entrance into the communication start area.

2. A DSRC car-mounted equipment for transmitting and receiving data with an on-the-road equipment comprising:

a reception sensitivity-increasing means for increasing the reception sensitivity in a communication area with an on-the-road equipment in response to the entrance into a communication start area with the on-the-road equipment; wherein the reception sensitivity-increasing means returns the reception sensitivity back to a normal reception sensitivity of before entering into the communication start area in response to the end of communication with the on-the-road equipment, said DSRC car-mounted equipment further comprising transmission output-increasing means for increasing the transmission output to the on-the-road equipment in the communication area in response to the entrance into the communication start area, wherein the transmission output-increasing means returns the transmission output back to a normal transmission output of before entering into the communication start area in response to the end of communication with the on-the-road equipment, wherein the transmission output-increasing means includes:

a transmission amplifier for amplifying a signal transmitted to the on-the-road equipment; and a transmission control unit for controlling the amplification factor of the transmission amplifier in response to a signal received from the on-the-road equipment; wherein the transmission control unit changes the amplification factor of the transmission amplifier to an amplification factor larger than a normal amplification factor in response to at least a second or a subsequent communication signal received from the on-the-road equipment after the entrance into the communication start area.

3. A DSRC car-mounted equipment for transmitting and receiving data with an on-the-road equipment comprising:

a reception sensitivity-increasing means for increasing the reception sensitivity in a communication area with an on-the-road equipment in response to the entrance into a communication start area with the on-the-road equipment; wherein the reception sensitivity-increasing means returns the reception sensitivity back to a normal reception sensitivity of before entering into the communication start area in response to the end of communication with the on-the-road equipment, wherein said DSRC car-mounted equipment further comprises a vehicle speed control unit for producing a vehicle speed data of a vehicle, wherein the reception sensitivity-increasing means includes:

a predetermined value-setting means for setting a first predetermined value corresponding to a low-speed running state of the vehicle and a second predetermined value corresponding to a high-speed running state of the vehicle; and a vehicle speed-judging means for comparing the vehicle speed data with the first and second predetermined values; wherein when the vehicle speed data is smaller than the first predetermined value, the normal reception sensitivity is corrected toward a decreasing side; and when the vehicle speed data is larger than the second predetermined value, the normal reception sensitivity is corrected toward an increasing side.

* * * * *